United States Patent [19]

Hutchings

[11] 4,281,930

[45] Aug. 4, 1981

[54] LASER GYRO WITH PHASED DITHERED MIRRORS

[75] Inventor: Thomas J. Hutchings, Thousand Oaks, Calif.

[73] Assignee: Litton Systems, Inc., Beverly Hills, Calif.

[21] Appl. No.: 970,603

[22] Filed: Dec. 18, 1978

[51] Int. Cl.³ .............................................. G01C 19/64
[52] U.S. Cl. .................................................... 356/350
[58] Field of Search ................................ 356/350, 351

[56] References Cited

U.S. PATENT DOCUMENTS

| | | | |
|---|---|---|---|
| 3,533,014 | 10/1970 | Coccoli et al. | 356/350 |
| 3,581,227 | 5/1971 | Podgorski | 356/350 |
| 4,152,071 | 5/1979 | Podgorski | 356/350 |

Primary Examiner—Vincent P. McGraw

Attorney, Agent, or Firm—Roy L. Brown

[57] ABSTRACT

A single mode laser gyro having two oppositely traveling laser beams is provided with mechanically dithered mirrors at its three or four reflection points. Each mirror is mounted for movement in and out as the result of the expansion and contraction of stacks of piezoelectric elements associated with each mirror. The mirrors are dithered or oscillated in and out, at the same frequency and in phase relationship with one another so that the perimeter distance for the laser cavity is held at a fixed number of wavelengths, but the laser beam translates back and forth across the faces of the mirrors. By this technique, the undesired phenomena of lock-in at low rotation rates is avoided, without the need for special optical or magnetic structures in the path of the laser beam.

15 Claims, 3 Drawing Figures

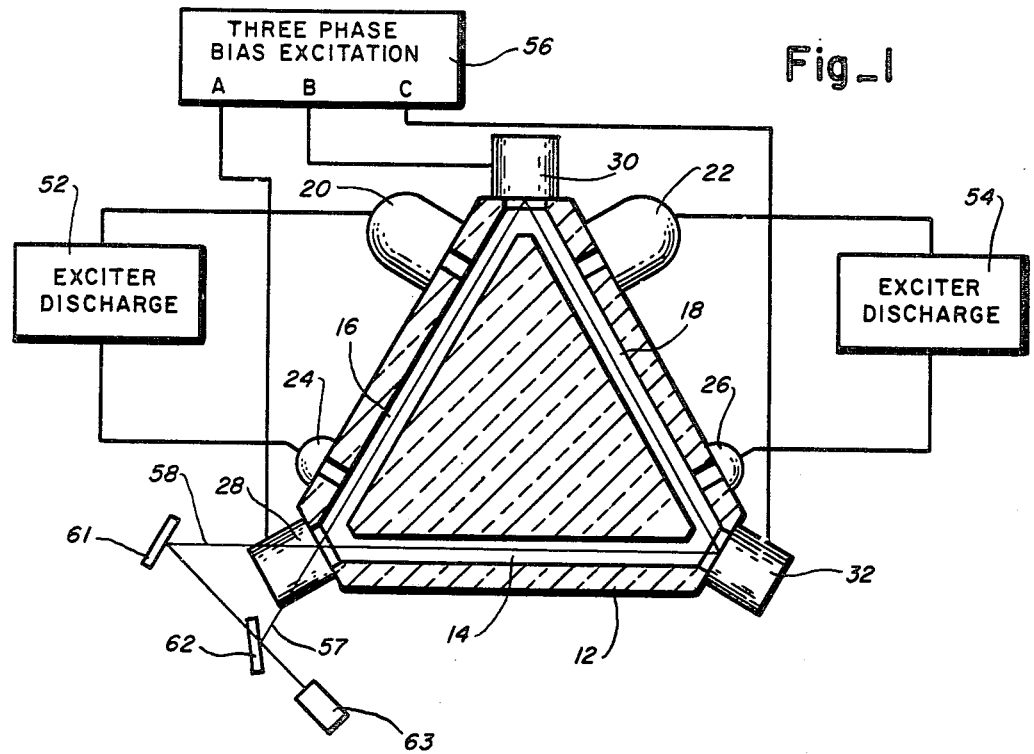
Fig_1
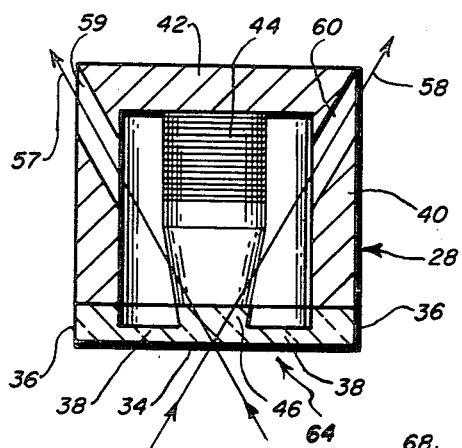
Fig_2
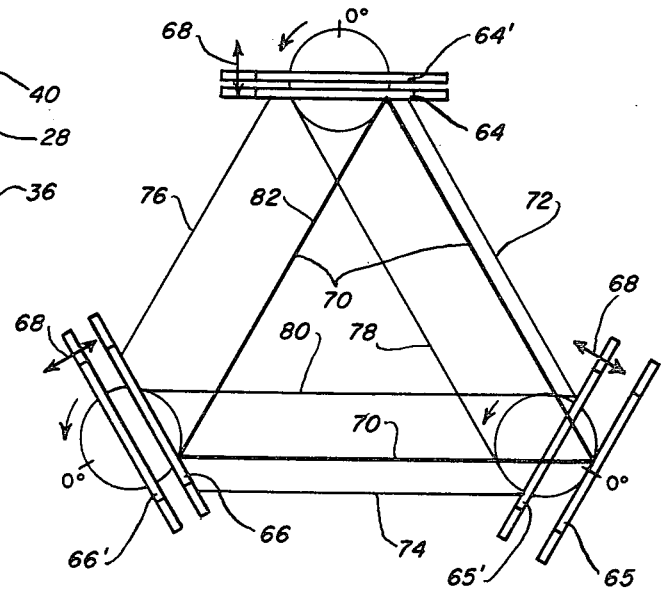
Fig_3

LASER GYRO WITH PHASED DITHERED MIRRORS

FIELD OF THE INVENTION

This invention relates to laser gyros having dithered mirrors.

This patent application is a substitute application for Patent Application Ser. No. 739,767, filed Nov. 8, 1976, now abandoned.

In the field of laser gyros, it is well known to use triangular or rectangular paths for the lasing phenomenon, with mirrors located at the apeces of the triangular path or at the corners of the rectangular path. In such laser gyros, rotation of the gyro in the plane of the laser path gives rise to a beat frequency between the counter-rotating laser beams, and this beat frequency may be used to determine the rotation of the gyro. Unfortunately, however, at very slow rotation rates in inertial space, the two counter-rotating beams tend to lock together and no difference frequency is observed. This is in part a function of back scattering, with some of the energy from each of the laser beams traveling in opposite directions being reflected back along the path of the other beam and tending to make the two beams lock in step.

Various techniques have been proposed for avoiding laser gyro lock-in, and these have included angularly vibrating the entire body of the laser gyro, and the use of non-reciprocal phase shifting arrangements such as Faraday rotating elements. Of course, angularly vibrating the entire body of the laser device is not the most elegant manner of handling the lock-in problem, and the use of Faraday rotation or other magnetic or optical devices in the laser path makes for a more complex structure than might be desired.

Accordingly, a principal object of the present invention is to eliminate lock-in in laser gyros by a simpler and more straightforward method than those which have been employed up to the present time.

SUMMARY OF THE INVENTION

In accordance with the present invention, the mirrors at all of the reflection points of a laser gyro are dithered in and out at the same frequency, perpendicular to the reflection plane or, with a non planar mirror, along the optical axis of the mirror, with the phase of oscillation of the reflecting mirrors being staggered around the periphery of the laser gyro structure. More specifically, the phase difference of the oscillation with respect to adjacent mirrors is held equal to 360 degrees divided by the number of mirrors. This provides a constant path length for the primary counter-rotating beams, but shifts the laser beam across the face of each of the mirrors thereby shifting the phase of the back-scattered secondary light component, thus changing the coupling between the counter-rotating laser beams in a periodic manner that essentially prevents lock-in.

In accordance with a preferred feature of the invention, the displacement of each of the mirrors is quite small, being equal to approximately plus and minus one-fifth, or 0.19 times the wavelength of the laser radiation multiplied by the reciprocal of the sine of the angle of incidence of the laser beam on the mirror.

BRIEF DESCRIPTION OF THE DRAWING

FIG. 1 is a schematic showing of a laser gyro illustrating the principles of the present invention;

FIG. 2 shows a detail of one of the mirror and transducer assemblies which is located at each reflection point of the laser gyro; and FIG. 3 is a diagram indicating the relative movement of each of the three mirrors of FIG. 1, in an exaggerated way.

DETAILED DESCRIPTION

With reference to the drawings, FIG. 1 shows a laser body 12 which may for example be made of quartz. Three peripheral channels 14, 16 and 18 have been bored through the quartz body 12. Within the passageways 14, 16 and 18 is a combination of gases suitable for laser action. More specifically, the gas is approximately 90% helium and 10% neon, and it is at a pressure of approximately 3 torr, with atmospheric pressure being equal to approximately 760 torr.

In accordance with known laser practice two cathodes 20 and 22, and two anodes 24 and 26 are secured to the quartz body 12, and a gas discharge is established between cathode 20 and anode 24, as well as between cathode 22 and anode 26, in passageways 16 and 18, respectively.

Mirror and transducer assemblies 28, 30 and 32 are located at the three reflection points of the triangular laser gyro structure.

All of the elements described above, including the mirrors, cathodes, andoes, are tightly sealed to the quartz body 12 so that the gas within the passageways of the quartz body is maintained at the proper pressure and free from contamination. Laser action occurs in a single mode at approximately $5 \times 10^{14}$ Hz, or cycles per second. This corresponds to a wavelength of approximately 0.633 microns, and the resulting illumination is brilliant light red in color.

Each of the reflecting points of the laser gyro assembly of FIG. 1 is provided with a mirror and transducer assembly 28, 30 or 32, as mentioned above. The structure of one of these mirror and transducer assemblies 28 is shown in detail in FIG. 2. In FIG. 2 the mirror surface 34 faces the laser beams and reflects them from one of the passageways 14, 16, 18 to another. The mirror is securely fastened to the quartz body 12 about the rim 36 of the mirror face element. The mirror face element is also thinned down at 38 in an annular zone which extends around the mirror on its back surface just within the heavy outer rim 36. Secured to the rim 36 is a rigid housing 40 which may be cylindrical in shape. This cylindrical housing 40 is provided with a heavy bottom element 42.

Extending between the bottom 42 of the housing and the central portion of the mirror is a piezoelectric transducer stack 44. The piezoelectric transducer stack 44 is made up of a number of thin flat piezoelectric wafers. These wafers have the property that when a voltage is applied across them they get slightly thicker or slightly thinner, depending on the polarity of the voltage. The stack 44 may be made up of 15 piezoelectric wafers each of which is about 10 mils thick. Each have electrodes on their top and bottom surfaces and are connected "back to back", and alternate common electrodes are connected to one of the driving leads while the other set is connected to the opposite polarity driving lead. With the wafers being connected "back to back" and having oppositely directed electric fields across alternate wafers, they expand and contract in thickness together, exerting substantial pressure on the mirror center 46 and causing it to flex the diaphragm made up of the thin annular section 38 of the mirror. If it is desired to closed-loop servo the motion of the mirror surface 34, the piezoelectric wafer closest to the mirror is not connected to be driven, but has two separate wires connected to its surface across which is produced a voltage which is a measure of the position of surface 34.

The piezoelectric stacks may be made up of piezoelectric wafers available from Gulton as Gulton Type No. 1408. The approximate level of voltage found to produce the displacement discussed below was approximately 160 volts peak-to-peak to provide the displacement of the proper order of magnitude to obtain the amplitudes needed for the practice of the present invention as developed below. The pickoff wafer, in particular should be linear and temperature insensitive such as Clevite PZT8.

Returning to FIG. 1, electrical circuits include the two power supplies 52 and 54 of known types for energizing the gas discharges between the anodes and cathodes of the laser device.

The mirror surfaces of the assemblies 28, 30 and 32 are energized at the same frequency by the three phase bias excitation circuit 56. Each of the piezoelectric transducer stacks such as stack 44 shown in FIG. 2, are excited 120° out of phase with each other.

In FIGS. 2 and 3 reference is made to the laser beams 57 and 58 which pass through the partially coated mirror surface 34 and the apertures 59 and 60 in housing 40 to impinge upon mirrors 61 and 62. From these mirrors 61 and 62, the beams are directed to detector 63 which detects the beats between the two counter-rotating laser beams, which occur as the structure rotates, in a manner known in the art.

In FIG. 3, the three mirrors of the laser gyro are shown schematically at 64, 65 and 66. The neutral position of each of the mirrors is shown at 64', 65' and 66'. As indicated by the arrows 68 each of the mirrors moves in and out toward the center of the laser gyro structure. In FIG. 3 the heavy line 70 represents the path of the laser gyro beam with the mirrors in the position shown. More specifically, the mirror 65 is close to its furthest retracted position while each of the mirrors 64 and 66 are displaced from the mirror 65 by successive 120° increments and therefore are more advanced in their positions, thus maintaining the triangular laser path substantially constant, as the three mirrors progressively move in and out in their phased relationships.

For a four mirror laser gyro geometry, the four mirrors would be energized by a four phase supply, and the successive mirrors would be operated 90° out of phase with each other, around the periphery of the structure. More generally, the phase displacement between adjacent mirrors should be equal to 360° divided by the number of mirrors.

With regard to the frequency of the excitation source 56 of FIG. 1 it is desirable that the frequency be relatively high in the order of some tens of kilocycles, up to several hundreds of kilocycles. However, frequencies as low as 1 or 2 kilocycles may be employed.

Further, as the mirrors move in and out from their extreme retracted position to their extreme advanced positions, the laser beams move back and forth across the mirror from one extreme position given by lines 72, 74 and 76 to the other extreme position given by lines 78, 80 and 82. Of course, as indicated by the triangular path 70 shown in FIG. 3, the beams reach the extreme positions given by lines 72, 74 and 76, and subsequently reach the inner boundaries 78, 80 and 82 at different points in time, always maintaining the laser path precisely the same length.

A closely related prior disclosure is found in J. D. Coccoli et al, U.S. Pat. No. 3,533,014 granted Oct. 6, 1970 and entitled "Gas Ring Laser Using Oscillating Radiation Scattering Sources Within the Laser Cavity". The Coccoli patent discloses an arrangement wherein the mirrors and other scattering sources are oscillated parallel to their faces, and not necessarily at the same frequency, rather than perpendicular to their faces as disclosed in the present specification. It is most difficult to implement arrangements for moving the mirrors of a laser gyro in their own plane, while concurrently keeping the laser cavities sealed and meeting the other necessary requirements.

Coccoli, in his FIG. 3A teaches one means for obtaining oscillation in the plane of the mirror. He recognizes that oscillation of the mirror parallel to the plane of the mirror frequency modulates the back-scattered radiation in a fashion such that the scattered radiation is frequency shifted from the frequencies of the primary traveling waves by an amount proportional to the velocity of the scattering surface.

The present invention, using precisely phased motion of the mirrors perpendicular to their faces shifts the point of contact of the laser beams back and forth across the faces of the mirrors. The formula set forth in Column 6, lines 53 to 55, of Coccoli et al is applicable to the amplitude of vibration of the mirrors in the present specification. This surprising result arises partly from the fact that the laser beams are translated back and forth across the faces of the mirrors by exactly the same amount of distance that the mirrors are oscillated in and out and partly from the fact that the phase modulation experienced by the apparatus of this invention may be characterized by a Bessel series.

The formula of J. D. Coccoli U.S. Pat. No. 3,533,014 identified above, is set forth below in abridged form $$A = \frac{\beta \lambda}{4 \pi (\sin\theta)} \tag{1}$$

where "A" is the maximum displacement of each mirror in each direction from a neutral position. $\lambda$ is the wavelength of the laser light, $\theta$ is the angle of incidence of the laser beams relative to a perpendicular to the mirror at the point of incidence, and $\beta$ is any number which, taken as the argument of the Bessel function of the first kind of zero order yields a value of the Bessel function which is zero.

For the triangular geometry of FIG. 1, $\theta$ is 30°, and $\sin \theta$ is equal to one-half. From mathematical tables, $\beta$ is equal to 2.405 for the lowest order Bessel function, Jo. Substituting these values into Equation (1) the following results obtain:

$$A = \frac{0.191 \lambda}{\sin \theta} \tag{2}$$

$$A = 0.382 \lambda \tag{3}$$

Using the neon-helium gas mentioned above, the wavelength is 0.633 microns, and the displacement amplitude "A" is equal to about 0.242 microns, or 0.242

$10^{-4}$ centimeters, in each direction from the neutral position of the mirrors.

For a four mirror system, $\theta = 45°$ and the proper value of A would be approximately 0.171 microns in each direction from the neutral position of the mirrors.

Coccoli teaches that there should preferably but not necessarily be a phase difference in the oscillation of the different mirrors. He specifies without proof in his Equation (3) that the optimum phase difference between consecutive mirrors for a four mirror ring laser with equal branches is 90 degrees. Coccoli uses these phase shift values so that at any particular time the velocities of the mirrors parallel to their reflecting surfaces will be different so that each mirror backscatters at a different frequency thereby preventing the different backscattered waves from reinforcing themselves. Further showing that this optimum phase difference is not critical, in his example calculation, he states that the phase difference should be greater than or equal to 90 degrees, 180 degrees, etc. If the branches of the laser are unequal in length, Coccoli et al teaches that the "optimum" phase shift is different than 90 degrees.

Using the shear oscillation specified by Coccoli, particularly in FIG. 3A, using an AT cut crystal, the amplitude of oscillation parallel to the plane of the crystal is specified to be 0.16 microns. With a crystal thickness of 1.5 mm, the motion perpendicular to the mirror surface is on the order of 0.000015 microns. The laser light wavelength is about 0.633 microns. However the motion normal to the mirror surface has an amplitude of about $(2.5)(10^{-6})$ wavelength which is negligible.

In the apparatus of this invention, the amplitude of oscillation of each mirror is 0.242 microns for a three mirror laser and 0.171 microns for a four mirror laser. Such motion is a significant portion of a wavelength of the laser light. If all the mirrors were oscillated in phase, the laser cavity length would be increased or shortened significantly, and the primary laser frequency would be significantly perturbed.

To avoid producing a change in the optical cavity length, the oscillations of the mirrors in a three mirror laser are phased 120 degrees apart. In a four mirror cavity they are phased 90 degrees apart. In a six mirror cavity they would be phased 60 degrees apart, and in an eight mirror cavity 45 degrees apart. The phasing must be held. It is not merely "optimum", but essential.

Preferably the mirrors are driven with pure sinusoids. However, drive with a complex wave shape is acceptable provided all of the Fourier components are phased the same as the fundamental component.

Preferably the drivers are matched drivers. If they are not, the driving current or voltage must be such that it compensates for the difference.

It is preferable that the mirrors and their drivers not be driven near their resonant frequency. It is also important that temperature effects be compensated so that the cavity length remains substantially constant.

The phasing may be maintained open loop, or a sensor (for example, one wafer of the crystal stack 44) may be attached to the mirrors to generate a signal representing the real-time position of the mirrors. The mirror phasing and amplitude could then be closed-loop servo controlled in the exciter 56 as shown by the double arrows on each lead.

Recapitulating, with the three mirrors phased exactly 120° with respect to each other, there is no change in the instantaneous optical cavity length. Thus the laser is maintained at a frequency position at the center of the gain curve with a minimum length perturbation due to the "microdither" modulation. The microdither amplitudes are of subwavelength dimensions.

Geometrical analysis shows that the triangular standing wave field is cause to translate, not rotate, in a manner such that the apexes of the triangle, as shown in FIG. 3, describe circles, while the points of impingement describe lines on the faces of the mirrors. As the mirrors move in and out, the laser beam translates back and forth across the mirror faces. This results in the scatter centers displacing with respect to the translated standing wave field nodes, hence satisfying the phase shift requirement of phase modulation. This displacement also results in the standing wave field being displaced with respect to a body fixed aperture.

In addition, the distance from one scatter group to the next group on the next mirror can be seen to be varying with time. It is the vector summation of the optically back-scattered light from all the scattering surfaces of the laser cavity that determines the magnitude of the "lock-in", as well as the final phase position. Thus, the microdither of the mirrors causes the net scatter vector to be time modulated. This effect further reduces "lock-in" effects.

For completeness, reference is made to U.S. Pat. No. 3,581,227 granted May 25, 1971, in addition to the U.S. Pat. No. 3,533,014 granted Oct. 6, 1970 cited above. U.S. Pat. No. 3,581,227 is of interest in showing a piezoelectric stack wherein the position of a mirror is shifted to accurately change the length of the laser cavity. This is a known technique, and could be used in the apparatus of the present invention as a DC bias upon which the properly phased alternating current signals could be superimposed. Of course, U.S. Pat. No. 3,581,227 does not disclose a plurality of mirrors each having the piezoelectric control, nor does it disclose the phased oscillation of the mirrors.

It is evident that other transducers could be employed for oscillating the mirrors in the proper phase relationship, instead of the piezoelectric transducers. For example, magnetostrictive transducers could be employed. In addition, of course, other lasing materials could be used and laser cavities having a different number of mirrors such as 4, for example, could be used. Other minor changes from the disclosed structure are also considered to be within the spirit and scope of the present invention.

I claim:

1. A ring laser comprising:
   means forming a closed loop optical cavity containing an active lasing medium for generating primary counter-rotating laser light beams therein, the frequency difference between the light beams having a measure of the rate of rotation experienced by the ring laser, said cavity forming means including a plurality of mirrors for reflecting said light beams; and
   means for vibrating each of said mirrors in translation at the same frequency in a direction only perpendicular to the surface of the mirror with each said mirror being vibrated at a phase difference with respect to each adjacent mirror substantially equal to 360° divided by the number of mirrors.

2. A ring laser as defined in claim 1 wherein said vibrating means comprises means for causing the displacement of each of said mirrors to be substantially sinusoidal with respect to time.

3. The device as claimed in claim 1 wherein the magnitude from a neutral position of the translational vibration of each "i"th mirror is in the order of:

$$\frac{\beta\lambda}{4\pi \sin \theta_i}$$

where $\lambda$ is the wavelength of the laser light beam, and $\theta i$ is equal to the angle of incidence of the light beams on that "i"th mirror relative to the perpendicular from the mirror at the point of incidence, and $\beta$ is an argument of Bessel's function of the first kind and zero order which makes that function $J_o(\beta) = 0$.

4. A ring laser as defined in claim 1 wherein said vibrating means comprises a transducer.

5. A ring laser as defined in claim 4 wherein said transducer comprises a stack of piezoelectric elements.

6. A ring laser comprising:
   a ring laser structure of the single mode type having two counter-rotating laser beams and including at least three mirrors:
   means for translating each said mirror in an oscillating mode at the same frequency substantially only in the direction of a line bisecting the beams incident on each said mirror; and
   means for phasing the movement of all of said mirrors to maintain constant primary laser beam path length as said mirrors are displaced.

7. A ring laser as defined in claim 6 wherein the magnitude from a neutral position of the translational oscillation of each "i"th mirror is in the order of:

$$\frac{\beta \lambda}{4 \pi \sin \theta i}$$

where $\lambda$ is the wavelength of the laser light beam and $\theta i$ is equal to the angle of incidence of the light beams on that "i"th mirror relative to the perpendicular from the mirror at the point of incidence, and $\beta$ is an argument of Bessels function of the first kind of zero order which makes that function $J_o(\beta) = 0$.

8. A ring laser as defined in claim 6 wherein the magnitude of the translational vibration of each "i"th mirror is in the order of:

$$\pm 0.19 \cdot \frac{\lambda}{\sin \theta_i}$$

where $\lambda$ is the wavelength of the laser light beam and $\theta$ is equal to the angle of incidence of the light beams on that "i"th mirror relative to the perpendicular from the mirror at the point of incidence.

9. A ring laser as defined in claim 8 wherein said vibration is substantially sinusoidal.

10. A ring laser as defined in claim 6 wherein all of the trigonometric Fourier components of said vibration are phased the same as the fundamental component.

11. A ring laser as defined in claim 6 in which said mirrors vibrate open-loop.

12. A ring laser as defined in claim 6 in which all of said mirrors are closed-loop servoed to control their amplitude and phasing.

13. A ring laser as recited in claim 6 wherein said ring laser has three mirrors, the amplitude of oscillation of each of said mirrors is substantially 0.242 microns, and the oscillation of consecutive mirrors in the laser path are 120 degrees apart.

14. A ring laser as recited in claim 6 wherein said ring laser has four mirrors, the amplitude of oscillation of each of said mirrors is substantially 0.171 microns, and the oscillation of consecutive mirrors in the laser path are 90 degrees apart.

15. A ring laser as recited in claim 6 wherein the phases of the n mirrors of a generalized closed laser path are related one to another by $2\pi/n$ radians and the amplitudes of the mirror displacements, x, are described by $$X = \frac{\beta_m \lambda}{4 \pi \sin \theta i} \sin \omega t$$

where $\beta_m$ is a value of the argument of the zero order Bessel function of the first kind, $J_o(\beta_m) = 0$ for $m = 1, 2, 3 \ldots$, $\theta i$ = angle of incidence at the "i"th mirror, $\omega$ = the dither angular frequency which is large compared to typical lock-in frequencies of said laser.

* * * * *